Sept. 12, 1950     C. HOLLIDAY ET AL     2,521,917
MICROMETER
Filed Jan. 15, 1945
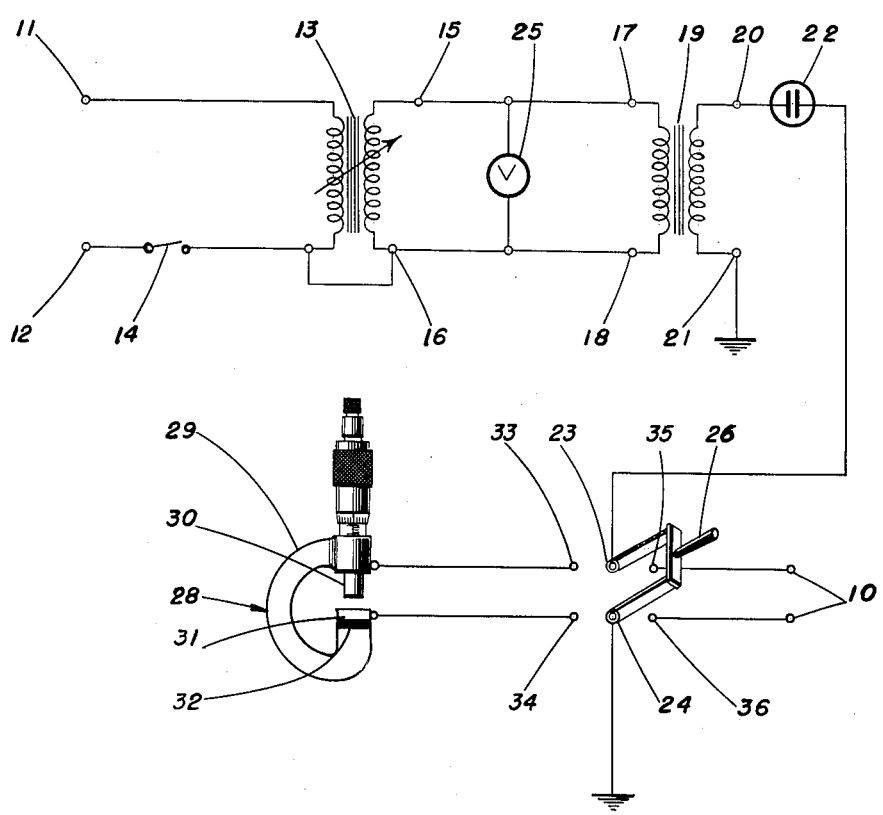
INVENTORS
**CLYDE HOLLIDAY
ALAN A. HAMILTON**
BY *F. T. Bush*
ATTORNEY Patented Sept. 12, 1950

2,521,917

UNITED STATES PATENT OFFICE 2,521,917

MICROMETER

Clyde Holliday and Alan A. Hamilton, Silver Spring, Md., assignors to the United States of America as represented by the Secretary of the Navy Application January 15, 1945, Serial No. 572,941

1 Claim. (Cl. 175—183)

This invention relates generally to measuring devices and more particularly to an improved electric micrometer.

The principal object of the invention is to provide a new and improved electric micrometer adapted accurately to measure the distance between two metal surfaces.

Another object of the invention is to provide an electric micrometer which is simple in construction in that it involves only a few conventional components and which, therefore, may be easily assembled and placed in operation. A further object of the invention is to provide a measuring device of the character indicated which is easily calibrated.

For a better understanding of the invention, together with other and further objects thereof, reference is made to the following description taken in connection with the accompanying drawing of which the sole figure is a schematic diagram of a preferred embodiment of an improved electric micrometer in accordance with the present invention.

Referring now particularly to the drawing the numeral 10 indicates two conductive members representative of the metal surfaces the distance between which is to be measured and having an air dielectric therebetween. The voltage stress between the two conductive members required to effect breakdown or corona of the dielectric for any given distance between the conductive members has been empirically determined and is available in charts. The improved electric micrometer in accordance with the invention utilizes the relationship between distance and voltage accurately to measure an unknown distance between the two metal surfaces indicated generally at 10. For this purpose there is provided a supply circuit which comprises input terminals 11, 12, adapted to be connected to a conventional 110 volt 60 cycle alternating current household service line. The supply circuit also includes a variable transformer 13 of the auto-type which has its primary coupled through switch 14 to the input terminals and which is provided with secondary output terminals 15, 16 coupled to the input or primary terminals 17, 18 of a high tension transformer 19. The secondary circuit of transformer 19 is coupled through secondary output terminals 20, 21 to an indicating circuit which includes a glow-discharge tube 22 and blade terminals 23, 24 of double throw selector switch 26, the circuit being completed through grounded terminal 24 to the ground side of the secondary of transformer 19.

Included in circuit with the supply means, specifically in shunt with the secondary of transformer 13 is a voltmeter 25 calibrated in terms of distance for indicating the distance between conductive members 10 upon breakdown of the dielectric therebetween.

The distance measuring arrangement illustrated also includes a standard indicating device 28. Device 28 is a micrometer caliper having a yoke 29, a scale, a movable contact member 30 and a fixed contact member 31 disposed to form jaws. It is conventional in every respect with the exception that an insulating element 32 electrically isolates contact 31 from the rest of the caliper. The scale is calibrated in terms of distance in the conventional manner. The contacts of the standard are individually connected to clips 33, 34 of switch 26. The remaining clips 35, 36 of the switch are individually connected to the conductive members 10.

The operation of the improved electric micrometer has been made apparent by the foregoing description. Briefly however, the switch blades are first connected in circuit with clips 35, 36 and the voltage output of transformer 13 is varied until dielectric breakdown occurs and an arc across conductive members 10 results. Tube 22 then glows, indicating breakdown. Since voltmeter 25 is calibrated in terms of distance, it is read and the distance between conductive members 10 becomes known. In order to check the accuracy of the voltmeter reading or to calibrate the voltmeter, the switch blades are thrown into contact with clips 33, 34 and the applied voltage similarly increased until an arc occurs between contacts 30, 31 as indicated by tube 22. The reading of the scale of standard 28, calibrated in terms of distance, then affords an indication of the accuracy of the indications of meter 25.

While there has been described what is at present considered to be the preferred embodiment of this invention, it will be obvious to those skilled in the art that various changes and modifications may be made therein without departing from the invention and it is, therefore, aimed in the appended claim to cover all such changes and the modifications as fall within the true spirit and scope of the invention.

We claim:

An electrical distance measuring instrument, comprising a source of alternating current, two transformers each having a primary winding and a secondary winding, the first transformer having a variable transformation ratio and having its primary winding connected to said source, and the second transformer having a relatively high secondary voltage, said transformers being connected in concatenation, a voltage-responsive measuring instrument connected across the primary winding of the second transformer, and being calibrated in terms of distances, and a comparing circuit connected to the high voltage secondary winding of the second transformer, said circuit comprising a double blade double throw switch, one of said blades being grounded, the other blade being connected to one terminal of said high voltage secondary winding, a glow lamp connected in series in said connection, and the other terminal of said high voltage secondary winding being grounded, a pair of conductors having one pair of terminals spaced apart an unknown distance that is to be measured, the other pair of terminals of said conductors being connected to respective stationary contacts of one throw of said switch and a micrometer caliper having its anvil insulated from its spindle, and having said anvil and spindle connected to the respective contacts of the other throw of said switch.

CLYDE HOLLIDAY.
ALAN A. HAMILTON.

REFERENCES CITED

The following references are of record in the file of this patent:

UNITED STATES PATENTS

| Number | Name | Date |
|---|---|---|
| 1,215,150 | Hendricks | Feb. 6, 1917 |
| 1,750,699 | Austin | Mar. 18, 1930 |
| 1,960,168 | Schoenberg | May 22, 1934 |
| 2,150,015 | Witham | Mar. 7, 1939 |
| 2,217,509 | Byrant | Oct. 8, 1940 |
| 2,221,307 | Christie | Nov. 12, 1940 |